UNITED STATES PATENT OFFICE.

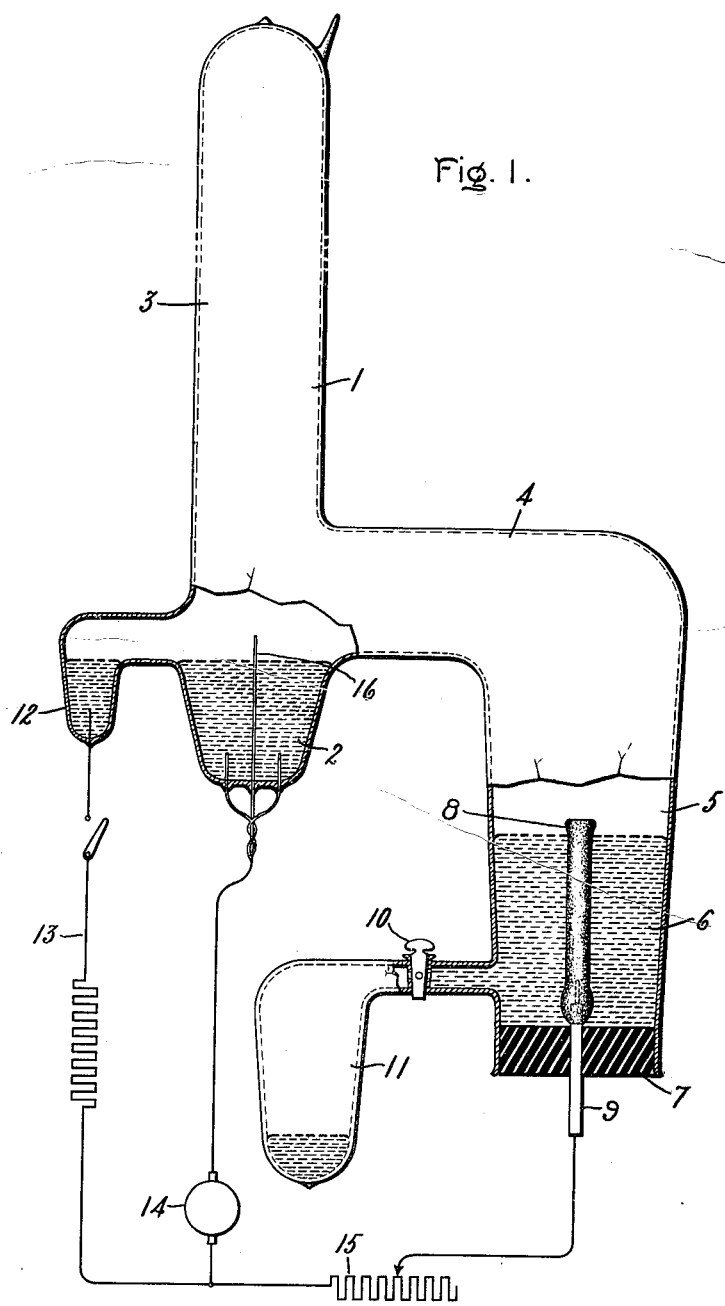

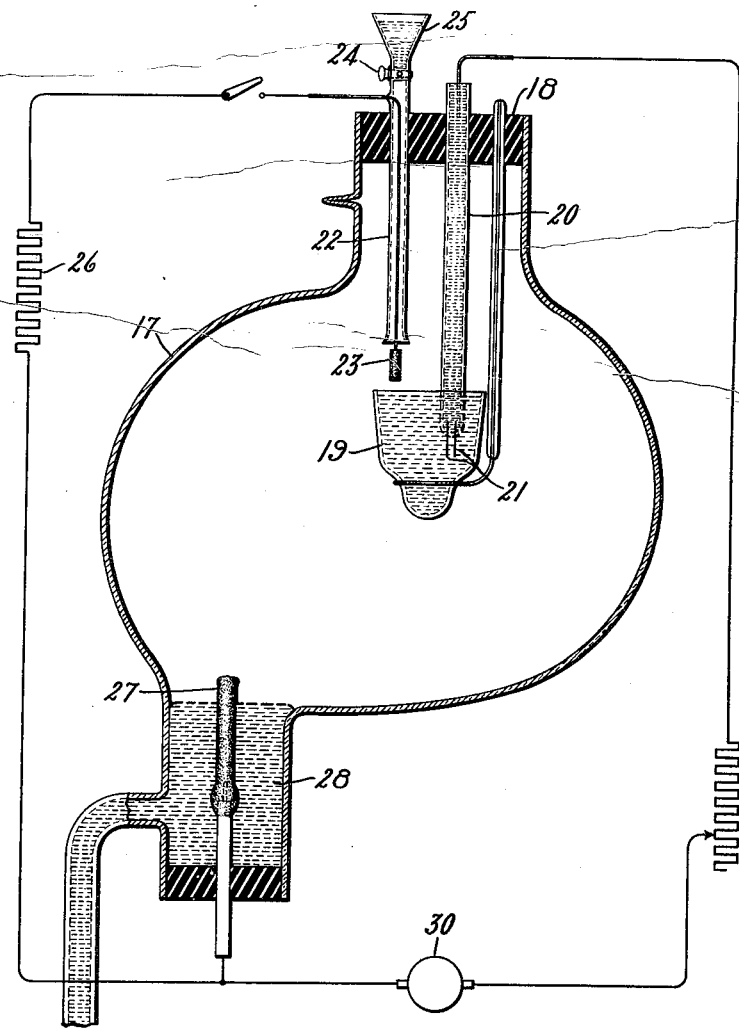

EZECHIEL WEINTRAUB, OF SCHENECTADY, NEW YORK, ASSIGNOR TO GENERAL ELECTRIC COMPANY, A CORPORATION OF NEW YORK.

TREATMENT OF REFRACTORY MATERIALS.

997,883.  Specification of Letters Patent.  Patented July 11, 1911.

Application filed July 2, 1906, Serial No. 324,399.   Renewed February 23, 1911.   Serial No. 610,390.

*To all whom it may concern:*

Be it known that I, EZECHIEL WEINTRAUB, a citizen of the United States, residing at Schenectady, county of Schenectady, State of New York, have invented certain new and useful Improvements in the Treatment of Refractory Materials, of which the following is a specification.

This invention relates to the heat treatment of refractory materials by means of an arc in a vacuum.

In carrying out my invention, I use the material to be melted or treated as an electrode in a vacuum arc furnace and I pass sufficient current through the arc to sinter or even to melt down the refractory material under treatment.

The apparatus whereby I carry out this process is hereinafter described and includes various novel means and arrangements whereby the heating action of the arc may be concentrated on the electrode and whereby the general treatment may be effectively and rapidly carried on.

I may apply my method to the fusion or purification of the more refractory metals such as tungsten, thorium, osmium, etc., by pressing up rods from the powdered metal and using them as anodes in a mercury arc.

In order that the means for carrying out my invention may be better understood, reference should be had to the drawings forming a part of this specification, in which—

Figure 1 is a view of one form of vacuum furnace suitable for the melting of tungsten and other refractory metals, and Fig. 2 is a modified form of furnace particularly adapted for the use of high current.

The vacuum furnace shown in Fig. 1 comprises an evacuated envelop 1 of glass or other suitable material provided with a mercury cathode 2 and a condensing chamber 3 located thereabove and also provided with a lateral extension 4 opening into an anode chamber 5. This anode chamber contains a relatively large body of mercury 6 and is closed at the bottom by a rubber cork 7. A rod 8 of the material to be melted or sintered by the heat of the arc is cemented or otherwise secured to a suitable lead-wire 9 projecting through the rubber cork. Before starting the operation, I prefer to have the level of the mercury in the anode chamber only slightly lower than the upper end of the stick to be treated as I find that with such an arrangement the heating action of the arc is concentrated on the end of the stick, and the latter may be readily fused down. The level of the mercury may be controlled by a stop cock 10 connecting with a waste mercury chamber 11 so that after the end of the refractory stick has been melted I may gradually draw off the mercury and thus cause the heated zone to gradually travel down the stick. The mercury at all times covers up the lead wire and prevents contact of the arc therewith. The product resulting from the high heat treatment above described is a globule of the metal fused or sintered by the heating action of the arc and substantially free from volatile impurities. As the rod 8 may be pressed or molded out of one of the metals ordinarily obtained only in a powdered form, the above treatment serves to consolidate and otherwise change the metal under treatment. To facilitate the starting of the mercury arc, I provide the apparatus with an auxiliary mercury anode 12 connected to the cathode and receiving direct current through a suitable circuit 13, and by this means I am able, by slightly shaking the tube to establish an arc to the mercury cathode 2 and thereby ionize the space and start the main arc. The main heating current is preferably a direct current and may be supplied by a suitable dynamo 14 and may be controlled by a rheostat 15 or other regulating mechanism. As the current is likely to be high, I prefer to provide the mercury cathode 2 with a plurality of leading-in wires, to diminish the likelihood of rupturing the glass because of the heating action of the current. I prefer to provide the cathode with a platinum wire 16 projecting slightly above the surface of the mercury as I find that this arrangement diminishes the total quantity of mercury vaporized from the cathode and consequently prevents an abnormal quantity of mercury vapor from cooling the anode by contact therewith.

In the operation of the furnace, I find that the metal stick under treatment carries substantially all the current, or in other words, that the mercury body surrounding the stick does not become anode with respect to the cathode of the tube. This phenomenon I attribute to the difference in the polarization of a mercury surface and of a solid anode, the polarization of the solid material being less than that of mercury; consequently the stick under treatment acts as anode to the exclusion of the surrounding mercury.

If desired, the apparatus may be cooled, either by an air blast of by water circulation.

Fig. 2 shows a modification adapted for the transmission of especially heavy currents. It comprises an evacuated envelop 17 provided at the top with a rubber stopper 18 from which is suspended a cathode cup 19 of silica, alumina or other non-conductive and refractory material. This cup is filled with mercury and is connected with a power circuit by means of a mercury column 20 inclosed in a tube the lower end of which is pierced by a plurality of lead-wires 21. The rubber stopper 18 also carries a glass tube 22 in which is supported an auxiliary anode 23 to serve as a starting means. This starting is effected by opening a stop cock 24 at the upper end of the tube 22 and permitting mercury to run down from a funnel 25 and momentarily establish contact between the auxiliary anode 23 and the mercury cathode and thereby initiate ionization by completing the circuit through a resistance 26 to a suitable source of current. The main anode of the furnace is at the lower end of the chamber and consists of a rod 27 of pressed metal or other material to be treated. It is surrounded by a body of mercury 28 which communicates with the open air through a barometric column 29. A suitable source of direct current 30 is connected between the anode and the cathode and the general heating operation is effected in the same manner as with the apparatus shown in Fig. 1. By supporting the cathode in a silica cup well removed from the walls of the vessel, it is impossible for the arc to come in contact with the glass, and I am thereby enabled to run the current density to a very high value without danger of cracking the envelop.

Although I have referred to mercury as a suitable material for establishing a heating arc, I also contemplate the use of amalgams and similar alloys, vaporizable at the operating temperature of the furnace and chemically inert with respect to the material under treatment.

What I claim as new and desire to secure by Letters Patent of the United States, is,—

1. The process which consists in compressing refractory powder into a coherent body, mounting said body as anode in an evacuated envelop containing a mercury cathode, and fusing said anode into a compact body by a mercury arc to said cathode.

2. The process which consists in mounting a refractory body as anode in an evacuated envelop containing a vaporizable cathode, striking an arc from said cathode and transferring the arc to said anode body, concentrating the heating action of said arc on a limited portion of said anode and fusing the same.

3. The process which consists in mounting a body of material as anode in an evacuated envelop containing a liquid cathode, producing an arc between said anode and cathode, and fusing said anode into a compact body.

4. The process which consists in compressing a refractory metal powder into a coherent body, mounting said body as anode in an evacuated envelop containing a mercury cathode and an auxiliary anode, striking an arc between said cathode and said auxiliary anode to initiate a flow of current between said refractory anode and said cathode and then progressively melting down said refractory anode into a compact body.

5. The process which consists in mounting a refractory body as anode in an evacuated envelop containing a mercury cathode, striking a heating arc to said anode, concentrating the heating action on a limited portion of said anode and progressively changing the anode surface exposed to the heating action of said arc.

6. The process which consists in mounting a refractory material as anode in an evacuated envelop containing a cathode, striking a heating arc to said anode, protecting a part of said anode from the heating action of said arc and gradually removing said protective means to produce a progressive treatment of said anode material.

7. The process which consists in compressing refractory powder into a coherent body, mounting said body as anode in an evacuated envelop containing a stationary cathode separated from said anode by a gap, striking an arc across said gap, and fusing said anode into a compact body by the heat of said arc.

8. The process which consists in mounting as anode a refractory material to be treated in fixed relation to a cathode but separated therefrom, maintaining a substantial vacuum about said anode and cathode, rendering the space between said anode and cathode conductive for current, and passing sufficient current therebetween to produce permanent changes in said anode.

9. The method of producing homogeneous bodies from a highly refractory metal, which consists in creating a substantial vacuum about said metal, ionizing the region adjacent to said metal and establishing an arc through that ionized region.

10. The method of producing homogeneous bodies from highly refractory metals, which consists in creating a substantial vacuum about said metal, ionizing the region adjacent to said metal and forming therein an electric arc from the metal.

11. The method of producing homogeneous bodies from tantalum and other highly refractory metals which consists in creating a substantial vacuum, ionizing the evacuated space and subjecting the metal to the influence of an electric arc therein.

12. The method of producing homogeneous bodies from tantalum and other highly refractory metals, which consists in creating a substantial vacuum, ionizing the evacuated space, and forming therein an electric arc from the metal.

13. The method of producing homogeneous bodies from tantalum and other highly refractory metals, which consists in creating a substantial vacuum, ionizing the region about said metal, connecting the metal with the anode of an electric arc circuit therein and passing an electric current through said circuit.

14. The process which consists in mounting a refractory material to be treated in an evacuated envelop, containing a mercury cathode, producing an arc in said envelop, and subjecting said refractory material to the heating action of said arc to produce changes therein.

In witness whereof, I have hereunto set my hand this 30th day of June, 1906.

EZECHIEL WEINTRAUB.

Witnesses:
EDWARD WILLIAMS, Jr.,
ARBA B. MARVIN, Jr.